United States Patent [19]
Knab

[11] 4,129,468
[45] Dec. 12, 1978

[54] METHOD AND APPARATUS FOR MANUFACTURING OPTICAL COMMUNICATION CABLES

[75] Inventor: Emil D. Knab, Cumming, Ga.

[73] Assignee: Bell Telephone Laboratories, Incorporated, Murray Hill, N.J.

[21] Appl. No.: 787,110

[22] Filed: Apr. 13, 1977

[51] Int. Cl.² ............... D01H 7/10; B32B 5/02; G02B 5/14
[52] U.S. Cl. ................. 156/148; 57/13; 57/59; 57/64; 156/172; 156/244.12; 156/500; 350/96.23
[58] Field of Search ............ 156/180, 187, 172, 148, 156/51, 441, 47, 296, 392, 431, 244, 324, 220, 201, 200, 244.12, 244.13; 350/96 B, 96 BR; 174/113 R, 117 F, 727 R, 121 R, 124 R; 425/114; 264/1, 103, 172, 174, 281, 295, 258; 57/3, 6, 13, 14, 12, 167, 59, 64; 65/4 B, DIG. 7

[56] References Cited

U.S. PATENT DOCUMENTS

| | | | |
|---|---|---|---|
| 2,585,484 | 2/1952 | Menes | 156/148 |
| 2,707,368 | 5/1955 | Pellman | 156/148 |
| 2,778,059 | 1/1957 | Henning et al. | 425/114 |
| 2,833,110 | 5/1958 | Fredriksson et al. | 57/14 |
| 3,303,251 | 2/1967 | Heider et al. | 425/114 |
| 3,887,265 | 6/1975 | Margolis et al. | 350/96 B |
| 3,983,313 | 9/1976 | Ney et al. | 174/113 R |
| 4,000,936 | 1/1977 | Gloge | 350/96 B |
| 4,078,853 | 3/1978 | Kempf | 350/96.23 |

FOREIGN PATENT DOCUMENTS

2556861   7/1976   Fed. Rep. of Germany ......... 350/96 B

OTHER PUBLICATIONS

"Optical Fiber Transmission, Jan. 1975, Williamsburg, Va. pp. WA2-1 to WA2-4.

*Primary Examiner*—Douglas J. Drummond
*Assistant Examiner*—Michael W. Ball
*Attorney, Agent, or Firm*—Charles E. Graves; Harry L. Newman; Sylvia J. Chin

[57] ABSTRACT

A cabling technique for assembling an optical communication cable having a helically twisted stacked array of optical fiber ribbons and an extruded cable jacket to which helically stranded longitudinal strength members are tightly coupled.

17 Claims, 11 Drawing Figures

METHOD AND APPARATUS FOR MANUFACTURING OPTICAL COMMUNICATION CABLES

FIELD OF THE INVENTION

This relates to light-transmitting optical fibers and, more particularly, to a method and apparatus for manufacturing optical communication cables.

BACKGROUND OF THE INVENTION

Light-transmitting optical fibers are desirable for their wide bandwidth capability and small physical size. However, they have some other less desirable characteristics which hinder their use as a feasible transmission medium. Unlike wire and metallic conductors, optical fibers are very brittle and can break at very small elongation ratios. Also, stressing of the fibers causes optical attenuation even where stressing does not result in static fatigue of the fibers. Hence, before optical fibers can be used, suitable means must be found to mechanically protect them.

One approach to the above problems has been to arrange optical fibers into linear arrays and package them in ribbon-like structures. The packaging provides some mechanical protection for the fibers while the arrangement advantageously positions the fibers in an orderly array desirable for mass fiber splicing.

The ribbons, in turn, are packaged into a cable structure to provide additional mechanical protection of the fibers. Optical ribbons, while less fragile than individual fibers, are still fairly fragile such that effort must be made not to subject ribbons to stress, which will pass on to the individual fibers.

Ribbon stressing is a substantial problem especially during the cabling operation when the ribbons are being packaged into a cable structure. A cabling operation can subject the ribbons to substantial stresses, such as from air turbulence, shock loads, and various twisting and bending motions, especially during helical stranding which is desirable to provide ribbon strain relief. Optical ribbons are mechanically sensitive structures highly susceptible to bending in the plane normal to the ribbon face. Also, while optical ribbons are more flexurally rigid in the plane of the ribbon face, flexing in that dimension can cause lateral buckling.

Hence, it is desirable to develop a technique for manufacturing optical cables which subjects the optical ribbons to a minimum of stress, and in turn, minimizes harm to the optical fibers.

Desirably, the resulting cable structure prevents the optical fibers from breaking during tensile loading of the cable, which is readily possible due to the brittleness of optical fibers.

Cable structures have been developed which feature cable jackets reinforced with longitudinal strength members which carry the tensile loads applied to the cables and minimize cable elongation. One such cable structure is disclosed in copending U.S. patent application, Ser. No. 661,389, filed Feb. 25, 1976, and assigned to the assignee hereof, in which the cable jacket is reinforced with embedded longitudinal strength members.

For maximum use of their strength, the longitudinal strength members are tightly coupled to and fully embedded in the cable jacket. Also, the strength members do not slack during cable manufacture which can permit superfluous cable elongation before the members become load bearing in the field. However, the strength members helically strand in the cable jacket to allow for bending of the cable which occurs for example, during cable installation.

Hence, it is also desirable to develop means for fully embedding in the cable jacket longitudinal strength members which carry the applied tensile loads and control elongation of the cable.

It is further desirable that a simple means be developed to helically strand the longitudinal strength members.

SUMMARY OF THE INVENTION

Pursuant to one aspect of this invention, a cabling method and apparatus have been developed which assemble a plurality of optical fiber ribbons into a particular helical array with a minimum of stress to the optical fiber ribbons.

The illustrative embodiment of the cabling apparatus features a novel optical ribbon payout which requires a minimum of space and apparatus. It cooperates with a ribbon-aligning guide to form a strander for helically stranding a plurality of ribbons into a particular helically stranded array. The optical ribbon payout feeds the ribbons into substantially parallel paths of travel which are in substantial axial alignment with the ribbon aligning guide to advantageously minimize angular deflection of the ribbons entering the guide.

One aspect of this invention is that the optical ribbon payout, which mounts onto a rotating platform, mechanically supports the optical ribbons and precisely controls their travel until they feed into the substantially parallel paths of travel which, in accordance with this invention, are substantially coincident with the axis of rotation of the platform where air turbulence generated by rotation of the platform is at a minimum.

Supporting the optical ribbons mechanically until the ribbons are in their predetermined parallel paths substantially reduces the effect of air turbulence on the ribbons by damping turbulence-induced vibrations. Also, by controlling the ribbons' travel, the ribbon payout advantageously minimizes undesirable ribbon buckling and/or bending.

A further aspect of this invention is that the ribbon-aligning guide rotates in synchronization with and about the same axis as the optical ribbon payout to ensure that the ribbons helically strand when they exit the ribbon-aligning guide. In the illustrative embodiment, the ribbon-aligning guide forms the ribbons into a stacked array and advantageously features an exit end having curved guiding surfaces to ensure gradual stranding of the stacked array, not abrupt stranding which can cause fiber breaks.

Also, pursuant to another aspect of this invention, the inventive cabling apparatus and method include a means and technique for embedding and helically stranding longitudinal strength members in an extruded cable jacket. The longitudinal strength members are directly introduced into the plastic flow producing the cable jacket where they are simultaneously positioned and helically stranded.

Accordingly, in the illustrative embodiment of the inventive cabling apparatus, the longitudinal strength members feed from supply spools mounted on a supporting board which revolves about the cable's axis of travel at a predetermined speed in accordance with the desired stranding lay for the strength members. A guiding ring, mounted on the supporting board, directs the strength members into paths at some predetermined radial distance from the inner cable which passes through an aperture in the axis of revolution of the supporting board.

The jacket extruder is positioned with its longitudinal axis coincidental with the cable's axis of travel so that the strength members and inner cable can easily pass longitudinally through the extruder's hollow core tube. The core tube includes an exit nosepiece with positioning orifices through which the strength members and the inner cable thread to enter the jacket-forming cavity, and a supporting sleeve extending from the exit surface of the nosepiece.

In accordance with this invention, the strength member payout and core tube rotate in synchronization and about the same axis to generate the desired strength member lay in the jacket forming cavity. Also, precise positioning of the strength members in the plastic flow is guaranteed by the positioning orifices and the supporting sleeve which elevates the strength members to facilitate complete encapsulation of the strength members. Also, because helical stranding generates in the jacket forming cavity, a controlled tensile load on the strength members is maintained to ensure that the strength members are taut as they are being embedded.

The invention and its further aspects, features, and advantages, will be readily discerned from a reading of the description to follow of an illustrative embodiment.

DETAILED DESCRIPTION OF ILLUSTRATIVE EMBODIMENTS

Figure 1:
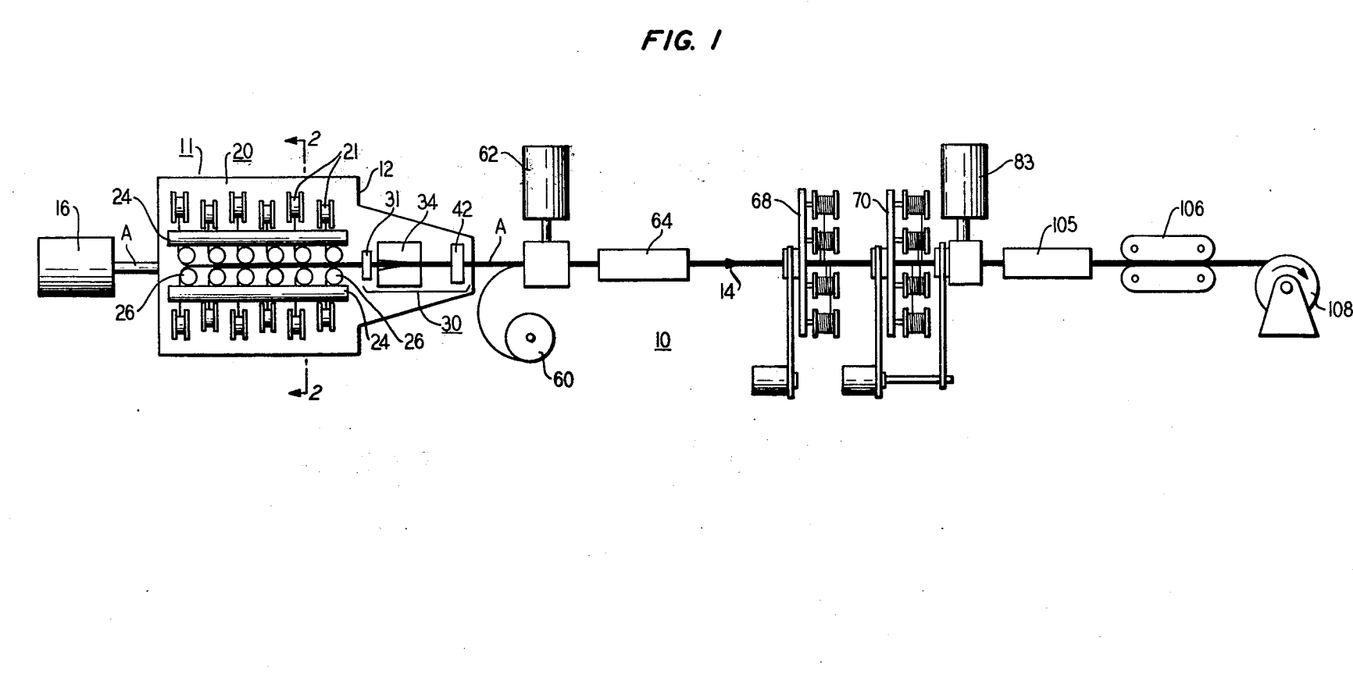
FIG. 1 illustrates schematically one illustrative embodiment of the inventive cabling apparatus.
Figure 11:
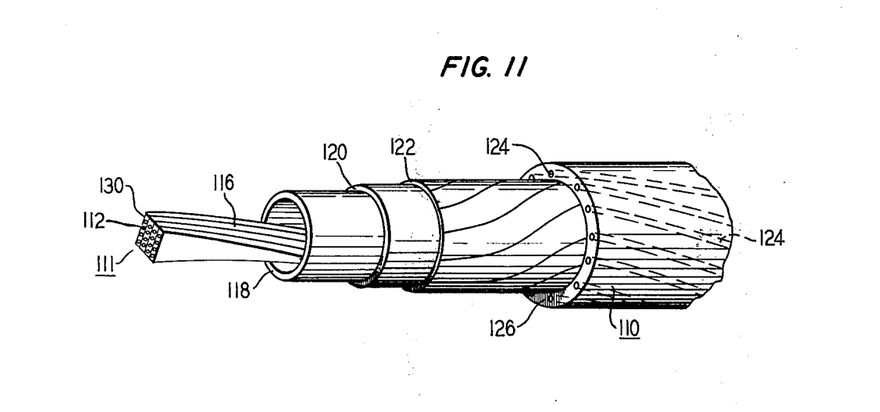
FIG. 11 shows in fragmented perspective an illustrative cable configuration assembled with the FIG. 1 cabling apparatus.

Shown schematically in FIG. 1 is an illustrative optical cabling apparatus 10 which produces an optical communication cable 110 having the structural configuration depicted in FIG. 11. The manufactured cable 110 in FIG. 11 comprises a helically twisted stacked array 111 of optical fiber ribbons 130 which form the cable core 116, a layer of paper wrap 118, an inner jacket 120 of extruded polyethylene, a protective layer 122 of polypropylene twine, and an outer jacket 126 of pressure extruded high-density polyethylene reinforced with longitudinal strength members 124. The strength members 124 are either graphite yarns or steel.

Referring back to FIG. 1, the illustrative optical cabling apparatus 10 comprises a ribbon payout 20, ribbonaligning device 30, paper supply reel 60, an inner jacket extruder 62, a cooling trough 64, a payout 68 for the thermal insulation layer, a payout 70 for the strength members 124, an outer jacket extruder 83, a second cooling trough 105, a belt capstan 106, and a reel 108 for taking up the manufactured cable 110.

In the illustrative embodiment, the optical ribbon payout 20 and ribbon-aligning device 30 mount onto a single platform 12, to form a strander 11. Platform 12 rotates on axis denoted A—A substantially coincident with the axis of travel for the cable being manufactured which is denoted by arrow 14. A motor 16 drives platform 12 at a predetermined rotational speed to strand the ribbons 130 into a desired twist as they exit device 30.

Optical ribbon payout 20 comprises an arrangement of optical ribbon supply reels 21, two cylindrical guiding drums 24 and idler sheaves 26, which are designed to feed the optical ribbons 130 into predetermined coplanar and parallel paths preparatory to their entry into the fiberaligning device 30 without introducing harmful stresses to the ribbons, and in turn, to the fibers.

Specifically, the optical ribbon supply reels 21 mount on either side of the rotational axis A—A to platform 12, such that they pivot about axes substantially parallel to the cable axis of travel 14. Advantageously, the supply reels 21 are distributed evenly on either side of platform 12 to assure weight balance of platform 12 during rotation. In the illustrative embodiment, six supply reels 21 are lined up in a staggered row on each side; the staggering of the rows is to maximize space efficiency on the platform 12. The supply reels 21 are tensioned by electronic brakes with a predetermined controlled force to prevent the ribbons 130 from flying off during rotation of platform 12, especially at high rotational speeds.

Figure 2:
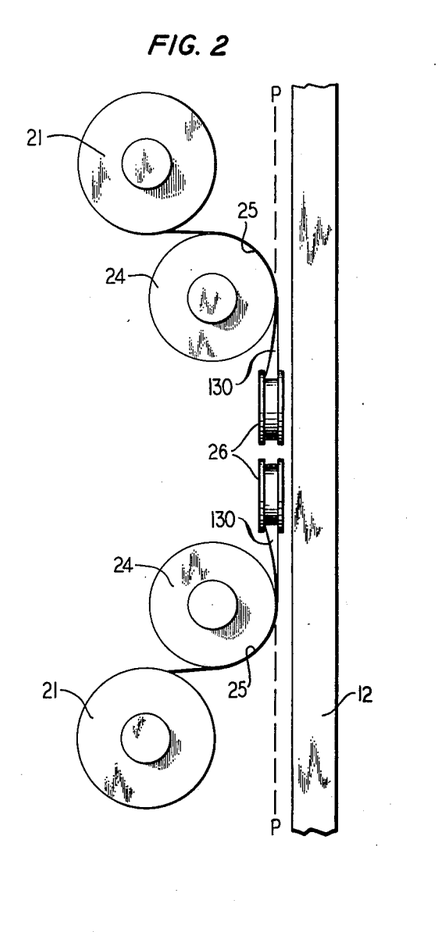
FIG. 2 illustrates the payout 20 taken along line 2—2 in FIG. 1.

The two smooth cylindrical drums 24 fixedly mount to the platform 12 with their longitudinal axes substantially parallel with the cable axis of travel 14. As depicted in FIG. 2 the particular surfaces 25 of the drums 24 operate as reference surfaces for gradually guiding the ribbons 130 into a predetermined plane of travel P' which includes the idler sheaves 26. The plane P' is normal to the plane of FIG. 2 and includes line P—P.

The idler sheaves 26 mount onto the platform 12 in the predetermined plane of travel P' as mentioned above and rotate freely about axes normal to the cable axis of travel 14. The sheaves 26 receive the ribbons 130 from the drums 24 and direct the ribbons 130 into the predetermined parallel and coplanar paths of travel.

Figure 3:
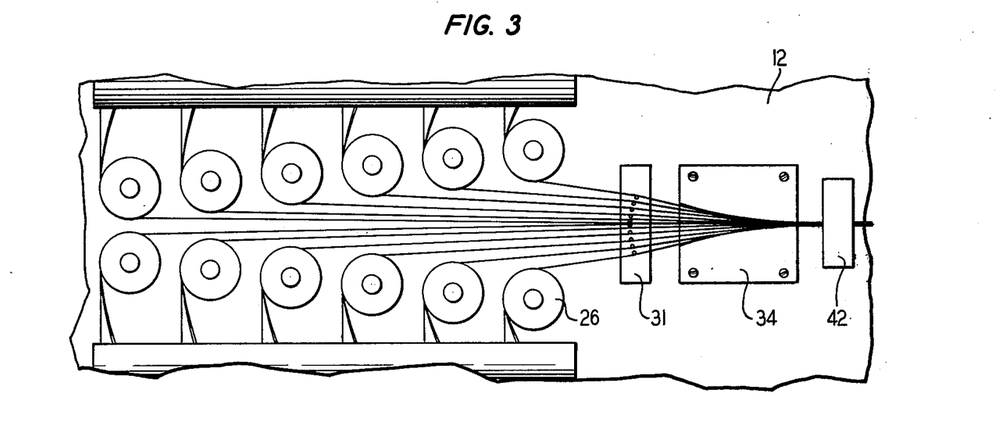
FIG. 3 illustrates in top view the ribbons being fed to the ribbon aligning device.

Advantageously, the sheaves 26 are arranged in a V-shaped configuration on platform 12. The sheaves furthest from the next cabling operation, i.e., the fiber-aligning device 30, are positioned closest to the cable axis of travel 14, while the sheaves closest to the next cabling operation are furthest in position from the cable axis of travel 14 as illustrated in FIG. 3 in exaggerated detail.

As a result, the ribbons 130 feeding from the sheaves 26 closest to the next cabling operation are assigned the outermost parallel paths while the ribbons 130 feeding from the sheaves 26 furthest from the next cabling operation are assigned paths most adjacent to the cable axis of travel 14. The ribbons 130 enter the parallel paths without overlapping or touching one another.

Figure 10:
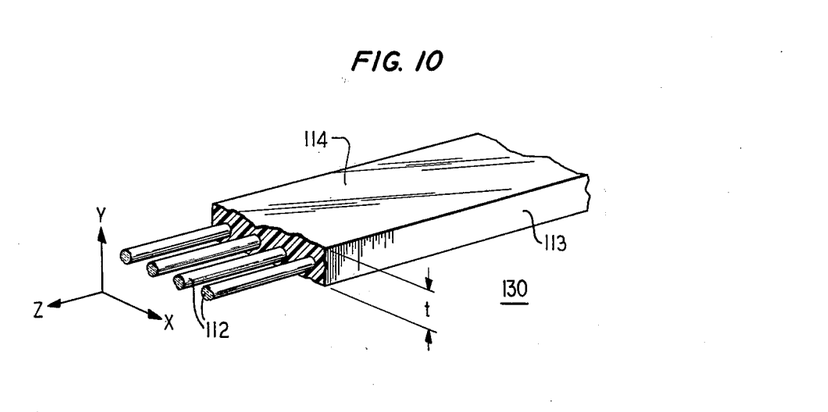
FIG. 10 depicts a typical optical fiber ribbon.

As mentioned earlier, optical fiber ribbons are highly mechanically sensitive structures. A typical ribbon 130 is depicted in FIG. 10. Ribbon 130 comprises a plurality of optical fibers 112, which are arranged in a parallel and coplanar array and embedded in a supporting medium 113. Because the thickness t of the ribbon 130 is very small, the ribbon's resistance to bending varies tremendously, depending on the plane in which it is bent. On the one hand, ribbon 130 has a preferred bending direction normal to the ribbon face 114, i.e., in the x-y plane, and is most flexible in this plane. On the other hand, the ribbon 130 is extremely rigid in the plane of the ribbon face, i.e., x-z plane, and will laterally buckle if flexed in this plane. Buckling is more severe as the bend gets sharper and therefore is more destructive to the fibers 112. Various bending motions occur during handling and cabling of the ribbons, especially during the helical stranding operation.

In accordance with the invention, the ribbons 130 are directed by the cylindrical drums 24 and idler sheaves 26 to enter the parallel and coplanar paths of travel which are advantageously substantially coincident with the axis of rotation A—A where air turbulence due to rotation of platform 12 is at a minimum. Also, the drums 24 and sheaves 26 support the ribbons 130 and precisely guide the ribbons' travel until the ribbons 130 enter the coplanar and parallel paths of travel without buckling and uncontrolled bending or twisting of the ribbons 130. It is noted that the ribbons 130 in their parallel paths have their faces 114 normal to the predetermined plane of travel P'.

In the payout arrangement the ribbons 130 come wrapped on the reels 21 in a helical fashion such that the ribbons 130 in leaving the reels in a path normal to the axes of the reels are not in continuous alignment vertically or horizontally with the receiving edges of the respective idler sheaves 26. The cylindrical drums 24 advantageously allow the ribbons 130 to find and travel along their most natural paths to the sheaves 26 so that no undesired or superfluous bending or buckling motions are generated where the ribbons 130 are not mechanically supported.

In the cabling operation the ribbons 130, wrapped with their faces 114 substantially parallel to the surfaces of the supply reels 21, feed to the cylindrical drums 24 along paths substantially normal to the axes of the reels 21. The ribbons 130 then make substantial surface contact with the cylindrical drum surfaces 25 via their ribbon faces 114. The drums 24 support the transverse displacement of the respective ribbons 130 in the plane x-z of the ribbons 130 as they move along the drum surfaces 25 to the respective idler sheaves 26. Because the ribbons 130 seek out their most natural paths, the ribbons 130 leave the reels 21 and enter the idler sheaves 26 along continuously smooth paths without buckling or severely bending. To increase the surface contact with the drums 24, the ribbons feed from the top of the reels 21 to pass under the drums 24 as depicted in FIG. 2. The ribbons hence do not buckle as they approach the drums from the supply reels 21. Also, no slack or buckling occurs as the ribbons exit from the drums and twist 90° to pass around the idler sheaves 26 with their faces 114 in contact with the sheaves 26.

Figure 4:
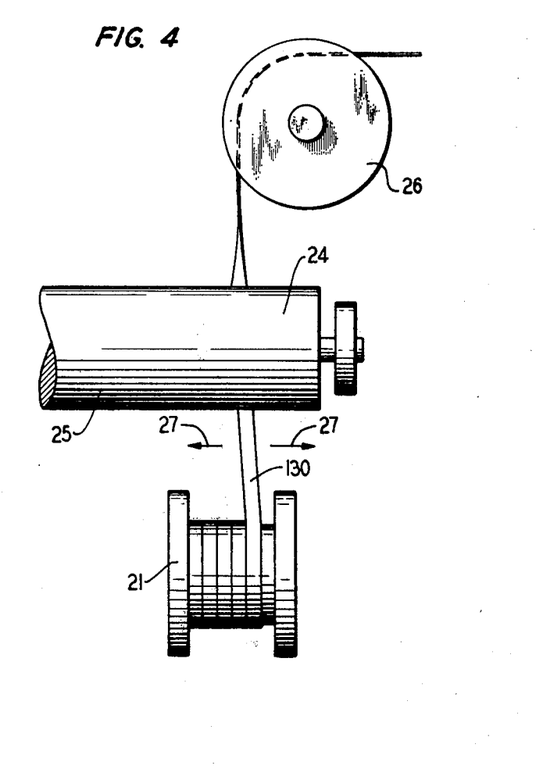
FIG. 4 illustrates a ribbon being directed into its predetermined path of travel.

Depicted in FIG. 4 is one illustrative ribbon 130 feeding to its corresponding sheave 26. The cylindrical drum 24 is advantageously stationary and not permitted to rotate. Hence, ribbon 130 can slide along the surface 25 of drum 24 and seek out its most natural path to idler sheave 26. The drum surface 25 also mechanically supports ribbon 130 as ribbon 130 moves in its x-z plane, as denoted by arrows 27, while travelling towards sheave 26 from supply reel 21.

Advantageously, the supply reels 21, drums 24, and idler sheaves 26 are substantially adjacent to one another to support the ribbons 130 sufficiently to dampen and prevent vibrations in the ribbons 130 otherwise introduced by air turbulence due to rotation of platform 12 where the ribbons 130 are not mechanically supported.

After the ribbons 130 have been directed into substantially parallel and coplanar paths of travel, they feed into the ribbon aligning device 30. Other ribbon stranding assemblies can be envisioned depending on the ribbon configuration desired. However, in accordance with this invention, the ribbons 130 are directed into substantially parallel paths substantially coincident with the rotational axis of the stranding assembly and substantially supported mechanically until they are in the substantially parallel paths.

In the illustrative cabling apparatus, the ribbon aligning device 30 comprises a comb 31, a ribbon stacking guide 34 and a twist restrainer 42.

Figure 5:
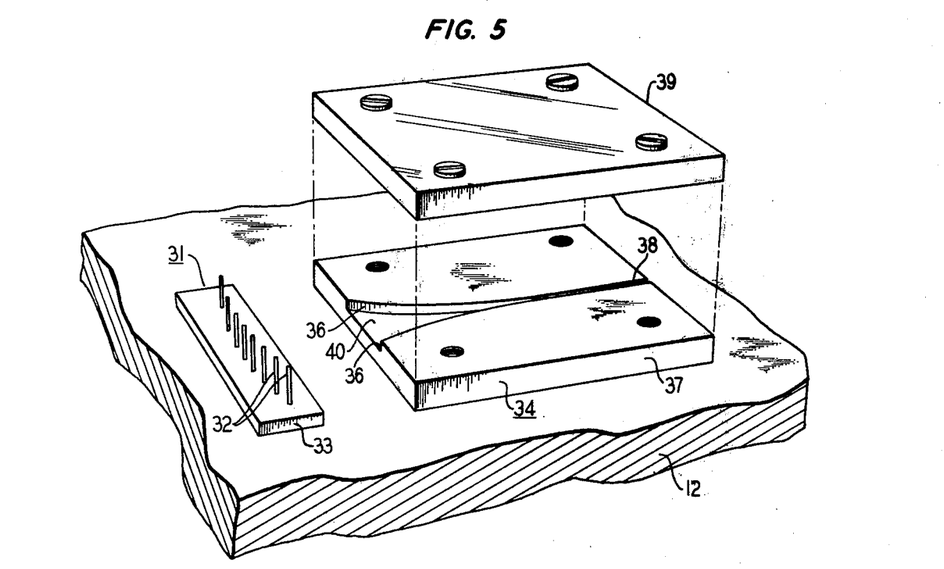
FIG. 5 illustrates in perspective view the ribbon stacking guide.

Comb 31, which is shown in FIG. 5, comprises a plurality of pins 32 mounted on a support plate 33 to separate the ribbons 130 as they enter ribbon-stacking guide 34. The comb 31 ensures that the individual ribbons are free to adjust horizontally and vertically as they enter into ribbon stacking guide 34.

Also illustrated in FIG. 5, ribbon stacking guide 34 comprises a baseplate 37 with a ribbon-guiding channel 38, and a coverplate 39. The ribbon guiding channel 38 is formed by the indented top surface 40 and the tapering interior side walls 36 of baseplate 37. The surface 40 and the coverplate 39 align the ribbons vertically while the tapering side walls gradually urge the ribbons 130 horziontally into a stacked array 116.

In the illustrative embodiment, the exit orifice of the ribbon stacking device has a horizontal opening sufficiently wide to allow some leeway in ribbon stack thickness.

Figure 6:
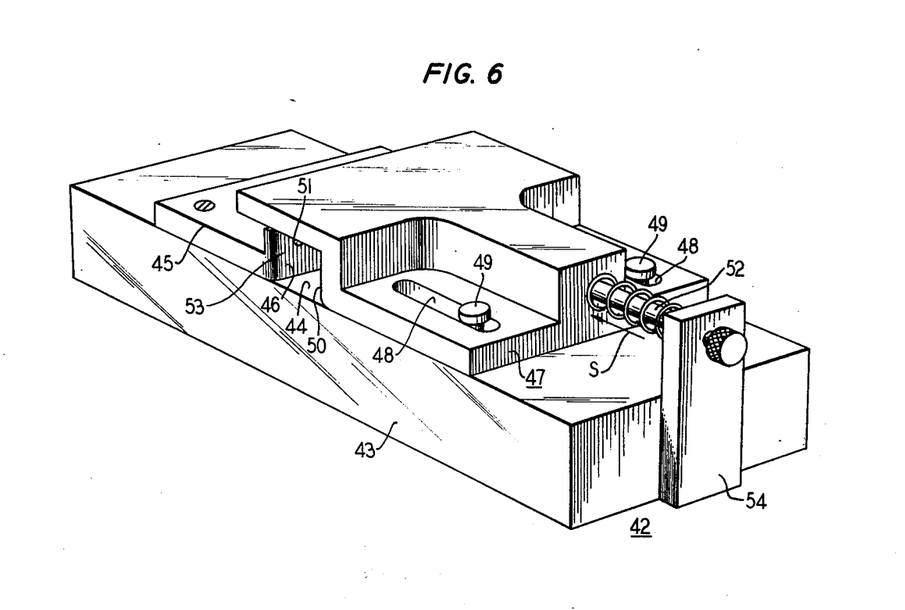
FIG. 6 depicts in perspective view the twist restrainer.

As depicted in FIG. 6, twist restrainer 42 comprises a baseplate 42, an L-shaped member 45, a slidable jaw member 47, and a spring-loaded pin 52 for applying a predetermined force S against the slidable jaw member 47. Jaw member 47 is slidably mounted to baseplate 43 with slots 48 and pins 49 while L-shaped member is fixed secured to baseplate 43. A ribbon stack orifice 53 having substantially the nominal size of the ribbon stack is formed by a side wall 46 of L-shaped member 45, the side wall 50 and top wall 51 of jaw member 47, and surface 44 of baseplate 43. The side walls 46 and 50 have tapered entry surfaces for gradually receiving the ribbon stack 116.

Figure 7:
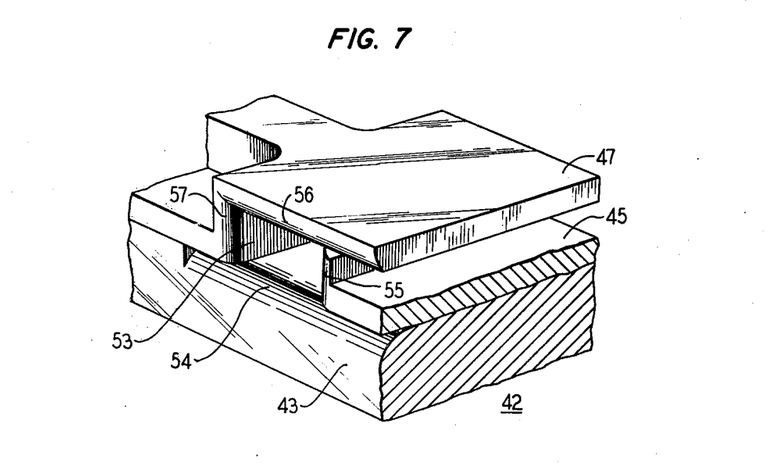
FIG. 7 shows the twist restraining surfaces of the exit end of the twist restrainer.

Shown in FIG. 7 is the exit end of the twist restrainer 42. The exit opening operates to restrain the twist as it is generated by the rotation of platform 12 from propagating back up the cabling line. Moreover, advantageously the exit surfaces 54, 55, 56, 57 of the orifice 53 are tapered to facilitate gradual twisting of the ribbon stack 111 and prevent any abrupt torsional or bending motions otherwise possible at the exit of the twist restrainer 42.

After the ribbons 130 enter into their substantially parallel paths they travel and thread through comb 31 which separates them so they can individually align in the ribbon stacking guide without encountering forces from the neighboring ribbons 130. After the ribbons 130 exit from the ribbon stacking guide 34 they are nominally arranged into the stacked array 111. The nominally stacked array 111 then passes through twist restrainer orifice 53. A controlled amount of spring loaded force S is applied to the stacked array 111 to ensure that the ribbons 130 form into a compact array so that the ribbons 130 do not slip with respect to each other or buckle when they helically strand upon exiting orifice 53, but strand as a unitary structure.

Also, the controlled force S ensures that the ribbon stack 111 is not crushed as it passes through orifice 53. The jaw 47 is free to deflect to allow anomalous periodic buildups in the ribbon stack 111 to pass through while maintaining the twist restraint capability of the orifice 53. The buildup in the particular ribbons 130 being stacked occurs only in the thickness of the ribbons 130.

The widths of the ribbons are accurately determined by a slitting process at the time of their manufacture when the supporting medium is cut to size. The ribbons assembled in the illustrative cabling apparatus are disclosed in copending application, Ser. No. 766,380, filed Feb. 7, 1977. also assigned to the assignee hereof. While the orifice 53 in illustrative twist restrainer 42 is only adjustable in one direction, it is readily apparent that the restrainer 42 may be adapted to allow for variations in the widths of the ribbons.

After the ribbons have been stacked and helically stranded, they pass through inner jacket extruder 62, where the inner jacket 120 is extruded around the core 116 as a tubular member. The extruder 62 features a mechanism for receiving the paper wrap 118 and for forming the paper along the interior surface of the extruded inner jacket 120. The jacketed core then passes through cooling trough 64. Thereafter, the jacketed core passes through a longitudinal bore in the rotating thermal insulation payout 68. As the jacketed core passes, the polypropylene twine feed from the twine supply spools and helically strand about the jacketed core.

Figure 8:
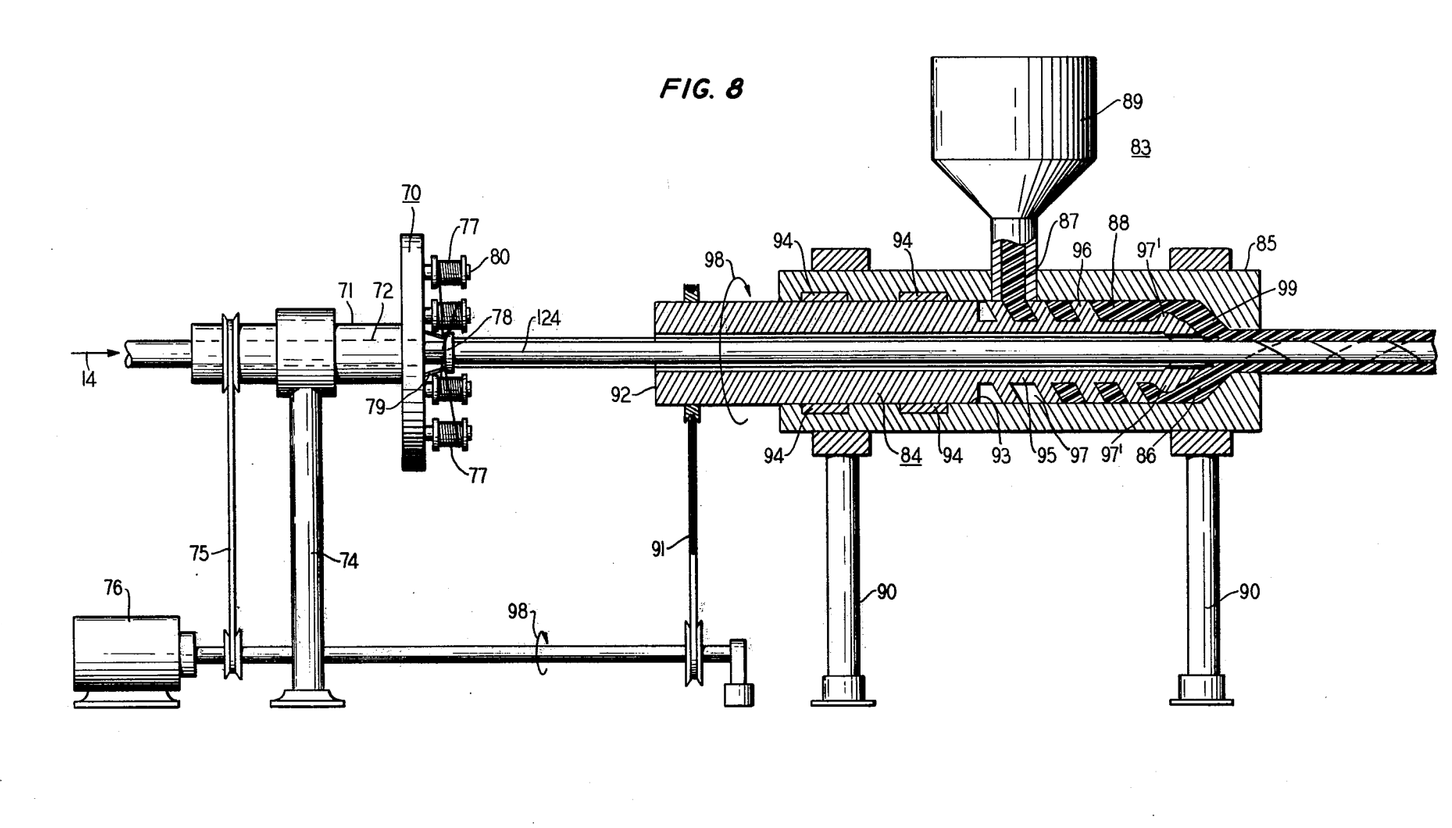
FIG. 8 shows schematically and in partial cross section the apparatus for stranding and embedding the longitudinal strength members in the outer cable jacket of the illustrative cable structure.

Shown in greater detail in FIG. 8 is the payout assembly 70 for the longitudinal strength members 124. The payout assembly 70 comprises a drive shaft 71 which has a hollow bore 72 through which the inner cable structure passes, a vertical disk like board 73 which mounts fixedly at its center to the drive draft 71, a stationary bearing assembly 74 which holds the drive shaft 71 in axial alignment with the cable axis of travel 14, and a drive linkage 75 which operates from and rotates drive shaft 71 when it is driven by motor 76.

Mounted on the disk like board 73 are a plurality of spools 77 which supply the longitudinal strength members 124 and a guiding ring 78 which is anchored to board 73 with legs 79 and in axial alignment with the hollow bore 72. A controlled amount of back tension is also applied to the spools 77 by hysteresis brakes 80 attached to the spool spindles, which are not shown.

Also shown in FIG. 8 is the outer jacket extruder assembly 83. The extruder assembly 83 comprises a core tube 84, which has an interior cross section for loosely receiving the inner cable structure and strength members 124, an extrusion die 85 which is in axial alignment with core tube 84 and includes a feeding port 87 for receiving extrudant 88, a jacket forming cavity 86, a feed hopper 89 which supplies the extrudant 88 to the feeding port 87, stationary bearing assemblies 90 which hold both the core tube 84 and extrusion die 85 in axial alignment with the cable axis of travel 14, and a drive linkage 91 which operates from and rotates core tube 84 when it is driven by motor 76.

Core tube 84 comprises a first longitudinal section 92 which is dimensioned on its outer surface to slidably fit the interior bore 93 of extrusion die 85 with carbon bearings 94. A second longitudinal section 95 comprises a fluted outer surface 96 which forms a spiral tunnel 97 with the interior bore 93 of extrusion die 85. The spiral tunnel 97 conveys the extrudant 88 from the feeding port 87 to the jacket forming cavity 86 as it rotates. In the illustrative embodiment, the spiral has a right hand twist and is rotated a clockwise direction as denoted by arrow 98. Advantageously, the spiral tunnel 97 reduces the pressure at which the extrudant enters the jacket forming cavity 86. In the illustrative embodiment, there is also a bulge 97' on surface 96 to equalize the extrudant flow to the jacket forming cavity 86.

Figure 9A:
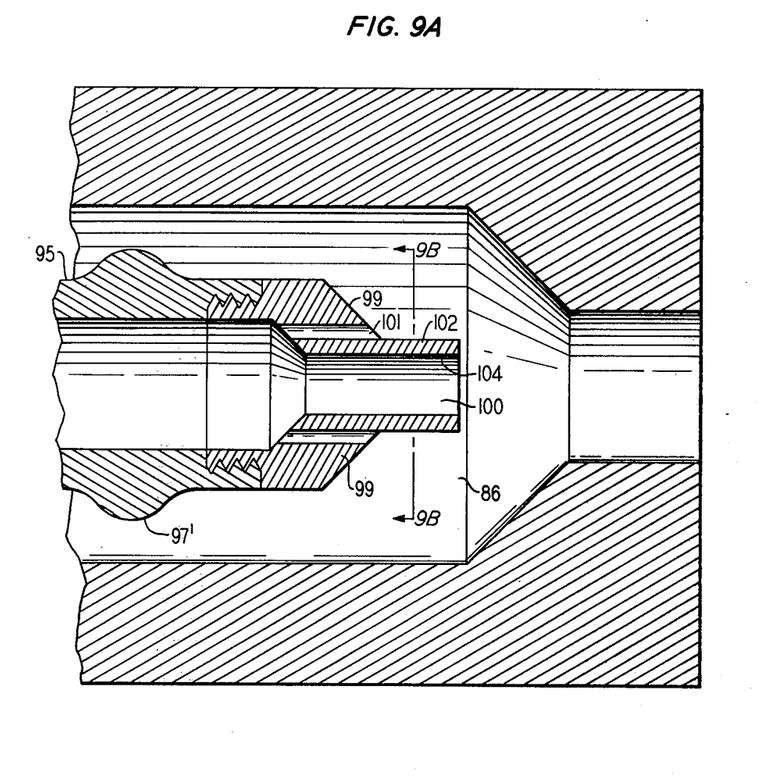
FIGS. 9A and 9B show the FIG. 8 nosepiece in greater detail.
Figure 9B:
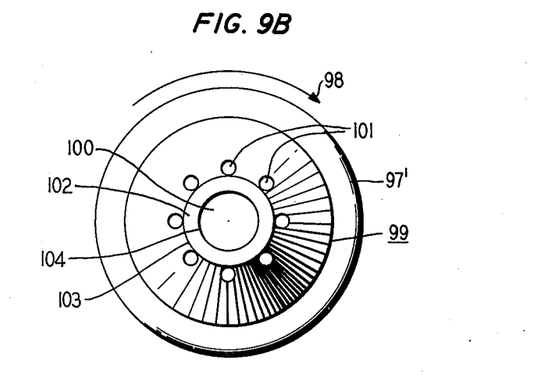

The second longitudinal section 95 tapers down to a nosepiece 99 at the jacket forming cavity 86. More clearly depicted in FIG. 9A, the nosepiece 99, which actually screws onto second section 95, comprises a central guiding orifice 100 through which the inner cable structure can pass and a plurality of longitudinal guiding ports 101, of which only two are seen, which are precisely spaced some radial distance from the inner cable structure and through which the strength members can thread to enter the jacket forming cavity 86. A sleeve 102 extends from nosepiece 99 with its outer diameter 103 touching the ports 101 and its inner diameter 104 substantially coterminous with the passing inner cable structure and delineating the central orifice 100. FIG. 9B illustrates the nosepiece taken along line 9B-9B in FIG. 9A.

Referring back to the cabling operation, after the thermal insulation layer 122 has been helically wrapped onto the jacketed core, the inner cable structure passes through first the hollow bore 72 and guiding ring 78 of the strength member payout assembly 70 and then through the core tube 84 of the extruder assembly 83 where it exits into the jacket forming cavity 86 through central guiding orifice 100.

At the same time, the strength members 124 feed from the supply spools 77 and thread through guiding ring 78 so that they are directed to travel in substantially longitudinal paths adjacent the inner cable structure. They enter the core tube 84 and then exit the core tube nosepiece 99 through guiding ports 101 into the jacket forming cavity 86. The nosepiece 99 is unscrewed from core tube section 95 to help thread the strength members 124. Where the strength members 124 are made of steel, the members 124 can easily be threaded through the guiding ports 101 of the unscrewed nosepiece 99. Where the strength members 124 are made of graphite yarns which are less rigid than steel, the nosepiece 99 can be modified to facilitate their placement in the ports 101. As shown in FIG. 9B, the nosepiece 99 can be made so the sleeve 102 unscrews along line 103, hence exposing the ports 101 as grooves to easily receive the strength members 124 made of graphite yarns.

The central guiding orifice 100 and guiding ports 101 advantageously position the cable components, i.e., the inner cable structure and longitudinal strength members 124, respectively in their assigned positions for the final cable structure.

As depicted in FIG. 8, strength member payout 70 and outer jacket extruder assembly 83 both rotate in synchronization and about the cable axis of travel 14.

Hence, the strength members 124 enter into the predetermined helical lay upon exit into the jacket forming cavity 86 in accordance with this invention. Also, back tension by the hysteresis brakes 80 at the strength member payout 70 holds the strength members 124 taut as they enter the jacket forming cavity 86 and are being embedded. Advantageously, the back tension also aids to hold the strength members 124 in their precise position as the extrudant 88 flows around the strength members 124.

The sleeve 102 elevates the strength members 124 from the inner cable structure until sufficient extrudant 88 has surrounded the surfaces of the strength members 124 to ensure flow of the extrudant 88 to the space between the inner cable structure and strength members 124.

As mentioned earlier, the core tube 84 is rotated in a clockwise direction 98 when looking at the core tube in FIG. 9B. Hence, the strength members enter into a right hand lay when they exit the extrusion die 85. The completed cable structure 110 then passes through cooling trough 105. The completed cable 110 and the cable components are advanced through the cabling operation with belt capstan 106. The platform 12 of the ribbon stranding mechanism and the strength member payout 70 in particular are electronically slaved to belt capstan 106 through fixed rotation to cable length ratios, to generate the desired strand for the ribbon core 116 and strength members 124 respectively.

Thereafter, the cable 110 is taken up with reel 108.

While the invention has been particularly shown and described with reference to the illustrative embodiment thereof, it will be understood by those skilled in the art, that the foregoing and other changes in form and detail may be made therein without departing from the spirit and scope of the invention.

What is claimed is:

1. Method for manufacturing an optical cable comprising a helically stranded stacked array of optical fiber ribbons comprising:
    directing said ribbons from a plurality of ribbon supply reels mounted on a platform rotatable about a predetermined axis, where each said reel pivots about an axis substantially parallel to said predetermined axis, into substantially parallel paths of travel in a predetermined plane with the faces of said ribbons being normal to said plane and said parallel paths being substantially coincident with said predetermined axis with at least one curved stationary surface for contacting each of said ribbons, where said surface has an axis of curvature substantially parallel to said predetermined axis and tangentially intersects said predetermined plane for gradually directing each said corresponding ribbon into said predetermined plane with the ribbon face of each said ribbon parallel to said plane, and a plurality of idler sheaves mounted in said plane with their axes of rotation normal to said plane for receiving said ribbons from said curved surface;
    controlling the orientation of the ribbon faces of said ribbons until said ribbons enter said substantially parallel paths with said curved stationary surface and said idler sheaves;
    substantially mechanically supporting said ribbons until they enter said parallel paths of travel with said curved stationary surface and said idler sheaves, said curved stationary surface supporting transverse displacements of said ribbons in the planes of their faces;
    bringing together said ribbons into a precise stacked array;
    applying a spring-loaded force to said stacked array with a device comprising a dimensionally varying orifice being formed in part by a movable wall, which supplies said spring-loaded force, to urge compacting of said ribbon stack; and
    rotating said ribbons and said stacked array about said predetermined axis to helically strand said stacked array.

2. Method pursuant to claim 1 further comprising the step of: controlling transition of said stacked array into a helically stranded stacked array.

3. Method pursuant to claim 1 wherein an inner cable structure comprising said helically stranded optical fiber ribbons is surrounded by an outer extruded cable jacket in which longitudinal strength members are embedded, said method further comprising:
    extruding said outer cable jacket in a jacket-forming cavity;
    introducing said longitudinal strength members and said inner cable structure into said jacket-forming cavity through guiding orifices of a nosepiece in a core tube, said longitudinal strength members being positioned by said orifices some radial distance from said inner cable structure.

4. The method pursuant to claim 3 wherein said inner cable structure further comprises an inner tubular jacket surrounding said ribbons, said method further comprising:
    extruding said inner tubular jacket.

5. The method purusant to claim 3 further comprising:
    elevating said strength members from said inner cable structure in said jacket-forming cavity until sufficient extrudant has flowed to completely surround said strength members.

6. Method pursuant to claim 3 wherein said longitudinal strength members are helically stranded in said jacket, said method further comprising:
    feeding said strength members from a payout assembly, said payout assembly and said core tube rotating in synchronization and about the cable axis of travel to generate unidirectional helical stranding of said strength members in said jacket-forming cavity.

7. The method pursuant to claim 6 further comprising:
    tensilely loading said strength members to hold them taut as they are being embedded in the extrudant forming said cable jacket in said jacket-forming cavity.

8. Method of manufacturing an optical cable comprising a core of optical fiber ribbons arranged in a helically stranded stacked array, a first layer of insulation, an inner tubular jacket, a second layer of insulation, and an outer cable jacket with helically stranded and embedded strength members, said method comprising:
    directing said ribbons from a plurality of ribbon supply reels mounted on a platform rotatable about a predetermined axis, where each said reel pivots about an axis substantially parallel to said predetermined axis, into substantially parallel paths in a predetermined plane with faces of said ribbons normal to said plane and said parallel paths being substantially coincident with said predetermined axis with at least one curved stationary surface for contacting each of said ribbons, where said surface has an axis of curvature substantially parallel to said predetermined axis and tangentially intersects said predetermined plane for gradually directing each said corresponding ribbon into said predetermined plane with the ribbon face of each said ribbon parallel to said plane, and a plurality of idler sheaves mounted in said plane with their axes of rotation normal to said plane for receiving said ribbons from said curved surface;

controlling the orientation of the ribbon faces of said ribbons until said ribbons enter said substantially parallel paths with said curved surface and said idler sheaves;

substantially mechanically supporting said ribbons until they enter said parallel paths of travel with said curved surface and said idler sheaves, said curved surface supporting transverse displacements of said ribbons in the planes of their faces;

bringing together said ribbons into a precise stacked array;

applying a spring-loaded force to said stacked array with a device comprising a dimensionally varying orifice being formed in part by a movable jaw which supplies said spring-loaded force, to urge compacting of said ribbon stack;

rotating said ribbons and said stacked array about said predetermined axis to helically strand said stacked array;

controlling transition of said stacked array into a helically stranded stacked array;

applying said first insulation layer around said core of stacked ribbons;

extruding said inner tubular jacket around said first insulation layer;

applying said second insulation layer around said inner tubular jacket;

feeding said strength members from a payout assembly;

extruding said outer cable jacket in a jacket-forming cavity;

introducing said longitudinal strength members and the insulated and tubular jacketed cable structure into said jacket-forming cavity through guiding orifices of a nosepiece formed at the end of a hollow core tube; and generating unidirectional helical stranding of said strength members in said jacket-forming cavity by rotating in synchronization and about the cable axis of travel the feeding means and said core tube.

9. Apparatus for manufacturing an optical cable comprising a plurality of helically stranded and stacked optical fiber ribbons comprising:

a strander comprising:
a platform rotatable about a predetermined axis to helically strand said ribbons;
a payout mounted to said platform, said payout comprising:
a plurality of reels for supplying ribbons, each reel pivotable about an axis substantially parallel to said predetermined axis;
at least one curved stationary and nonrotating surface with which said ribbons make sliding contact, said surface having an axis of curvature substantially parallel to said predetermined axis and tangentially intersecting a predetermined plane of travel for gradually directing each said corresponding ribbon into said predetermined plane of travel with the ribbon face of each said ribbon parallel to said plane of travel;
a plurality of idler sheaves mounted in said plane of travel with their axes of rotation normal to said plane of travel for receiving said ribbons from said curved surface where said curved surface supports transverse displacements of said ribbons in the planes of their faces to allow said ribbons to seek out their most natural paths from said reels to said idler sheaves and where said ribbons twist approximately 90 degrees between said sheaves and curved surface so their faces become positioned normal to said plane of travel; and
means for stacking said ribbon into a precise stacked array.

10. Apparatus pursuant to claim 9 where each reel has said corresponding ribbon helically wrapped such that said ribbon feeds from the top of the reel and travels under said curved surface to maximize surface contact with said curved surface.

11. Apparatus for manufacturing an optical cable comprising a plurality of helically stranded and stacked optical fiber ribbons comprising:

a platform rotatable about a predetermined axis to helically strand said ribbons;
a payout mounted to said platform, said payout comprising:
a plurality of reels for supplying ribbons, each reel pivotable about an axis substantially parallel to said predetermined axis;
at least one curved stationary surface for contacting each of said ribbons, said surface having an axis of curvature substantially parallel to said predetermined axis and tangentially intersecting a predetermined plane of travel for gradually directing each said corresponding ribbon into said predetermined plane of travel with the ribbon face of each said ribbon parallel to said plane of travel;
a plurality of idler sheaves mounted in said plane of travel with their axes of rotation normal to said plane of travel for receiving said ribbons from said curved surface where said curved surface supports transverse displacements of said ribbons in the planes of their faces to allow said ribbons to seek out their most natural paths from said reels to said idler sheaves and where said ribbons twist approximately 90 degrees between said sheaves and curved surface so their faces become positioned normal to said place of travel;
means for stacking said ribbon into a precise stacked array; and
means for controlling transition of said stacked array into a helically stranded stacked array, said controlling means comprising a dimensionally varying orifice being formed in part by a movable wall which supplies a spring-loaded force against said stack of ribbons to urge compacting of said ribbon stack.

12. Apparatus pursuant to claim 11 wherein said optical cable comprises an extruded cable jacket surrounding the inner cable structure comprising said ribbons, said extruded cable jacket being embedded with longitudinal strength members, said apparatus further comprising:

means for feeding said longitudinal strength members;

an extruder with a jacket-forming cavity and a hollow core tube through which said inner cable structure and said longitudinal strength members travel to enter said jacket-forming cavity, said core tube forming a nosepiece at said cavity, said nosepiece comprising a central orifice and a plurality of guiding ports positioned a fixed radial distance from said central orifice through which said inner cable structure and said strength members thread through respectively.

13. Apparatus pursuant to claim 12 wherein said inner cable structure further comprises an inner tubular jacket surrounding said ribbons, said apparatus further comprising:

means for extruding said inner tubular jacket.

14. Apparatus pursuant to claim 12 wherein said strength member feeding means and said core tube rotate in synchronization and about the same axis of rotation to generate unidirectional helical stranding of said longitudinal strength members in said jacket-forming cavity.

15. Apparatus pursuant to claim 14 wherein said feeding means comprises means for tensilely loading said strength members to hold them taut as they are being embedded in the extrudant forming said cable jacket in said jacket-forming cavity.

16. Apparatus pursuant to claim 15 wherein said nosepiece further comprises a sleeve extending into said jacket-forming cavity, said sleeve elevating said strength members until sufficient extrudant has flowed to completely embed said members.

17. Apparatus pursuant to claim 8 for manufacturing an optical cable comprising a core of said optical fiber ribbons arranged in a helically stranded stacked array surrounded by a first layer of insulation, an inner tubular jacket, a second layer of insulation, and then said outer jacket with helically stranded and embedded longitudinal strength members, said apparatus further comprising:

means for applying said first insulation layer around said core of optical fiber ribbons;

means for extruding said inner tubular jacket around said first insulation layer; and means for applying said second insulation layer around said inner tubular jacket.

* * * * *